United States Patent
Vargas et al.

[19]

[11] Patent Number: 6,083,015
[45] Date of Patent: Jul. 4, 2000

[54] CABLING MODULE ARRANGEMENT

[75] Inventors: Julio César Vargas, Braunschweig; Klaus-Dieter Stoppel, Wolfsburg, both of Germany

[73] Assignee: Volkswagen AG, Wolfsburg, Germany

[21] Appl. No.: 09/133,729

[22] Filed: Aug. 13, 1998

[30] Foreign Application Priority Data

Aug. 13, 1997 [DE] Germany .......................... 197 34 971

[51] Int. Cl.[7] ............................ H01R 13/44; H01R 11/00
[52] U.S. Cl. ............................................. 439/130; 439/505
[58] Field of Search ................................... 439/505, 502, 439/130, 211, 212, 624

[56] References Cited

U.S. PATENT DOCUMENTS

| | | | |
|---|---|---|---|
| 4,815,984 | 3/1989 | Sugiyama et al. | 439/211 |
| 4,857,003 | 8/1989 | Hafner et al. | 439/130 |
| 5,030,116 | 7/1991 | Sakai et al. | 439/130 |
| 5,127,382 | 7/1992 | Imoehl | 123/470 |
| 5,131,857 | 7/1992 | Gmelin et al. | 439/130 |
| 5,178,114 | 1/1993 | McArthur | 123/456 |
| 5,238,415 | 8/1993 | Bittner et al. | 439/130 |
| 5,347,969 | 9/1994 | Gmelin et al. | 123/456 |
| 5,431,981 | 7/1995 | Tanaka | 428/122 |
| 5,471,961 | 12/1995 | McArthur et al. | 123/456 |
| 5,534,665 | 7/1996 | Long . | |
| 5,584,704 | 12/1996 | Romann et al. | 439/130 |
| 5,595,494 | 1/1997 | Wiebe | 439/211 |
| 5,634,812 | 6/1997 | Chen | 439/419 |
| 5,702,267 | 12/1997 | Chen | 439/419 |

FOREIGN PATENT DOCUMENTS

| | | |
|---|---|---|
| 84 12 625 U | 4/1984 | Germany . |
| 3914930 | 10/1990 | Germany . |

OTHER PUBLICATIONS

Einsatz von Palladium anstelle von Gold bei elektrischen Kontakten by J. CL. Puippe, dated Sep. 1984.

Kupferwerkstoffe—Eigenschaften und Anwendungen in der Elektrotechnik und Elektronik by E. Arpaci, A. Bode, dated Jan. 1992.

*Primary Examiner*—Lincoln Donovan
*Assistant Examiner*—Chandrika Prasad
*Attorney, Agent, or Firm*—Baker Botts L.L.P.

[57] ABSTRACT

A cabling module arrangement includes a cabling strip and electric wires supported on the strip and a common plug to which at least some of the electric wires are electrically connected. The cabling strip has a geometrically stable configuration, and retainers are provided to secure the wires to the cable strip. One or more wires branch off from the cabling strip, and additional retainers are provided to secure the branching wires to the cabling strip. This provides a cabling module arrangement which is assembly- and disassembly-compatible and assures functionally secure connections of electrically actuatable accessories which are difficult to access.

11 Claims, 3 Drawing Sheets

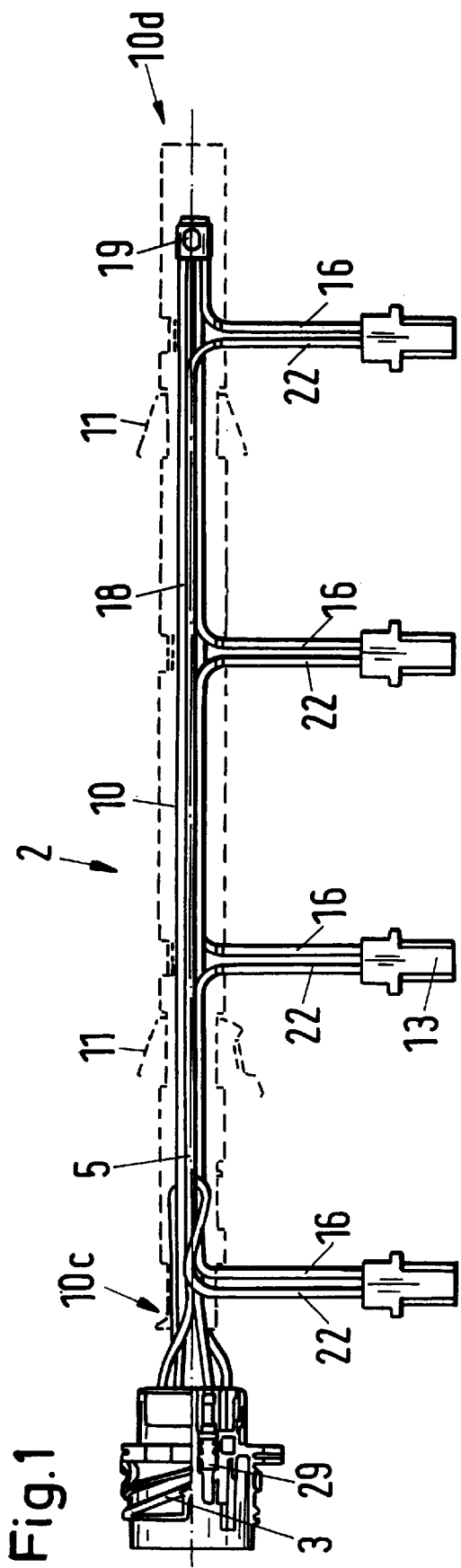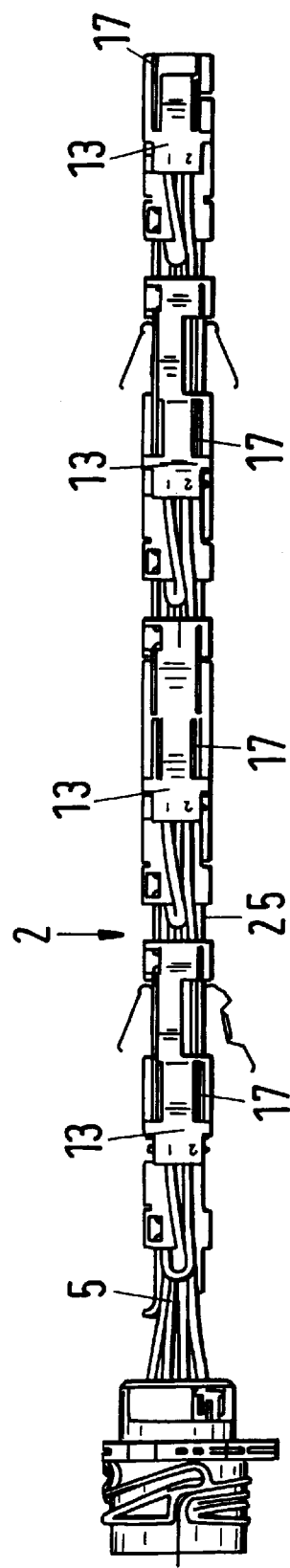

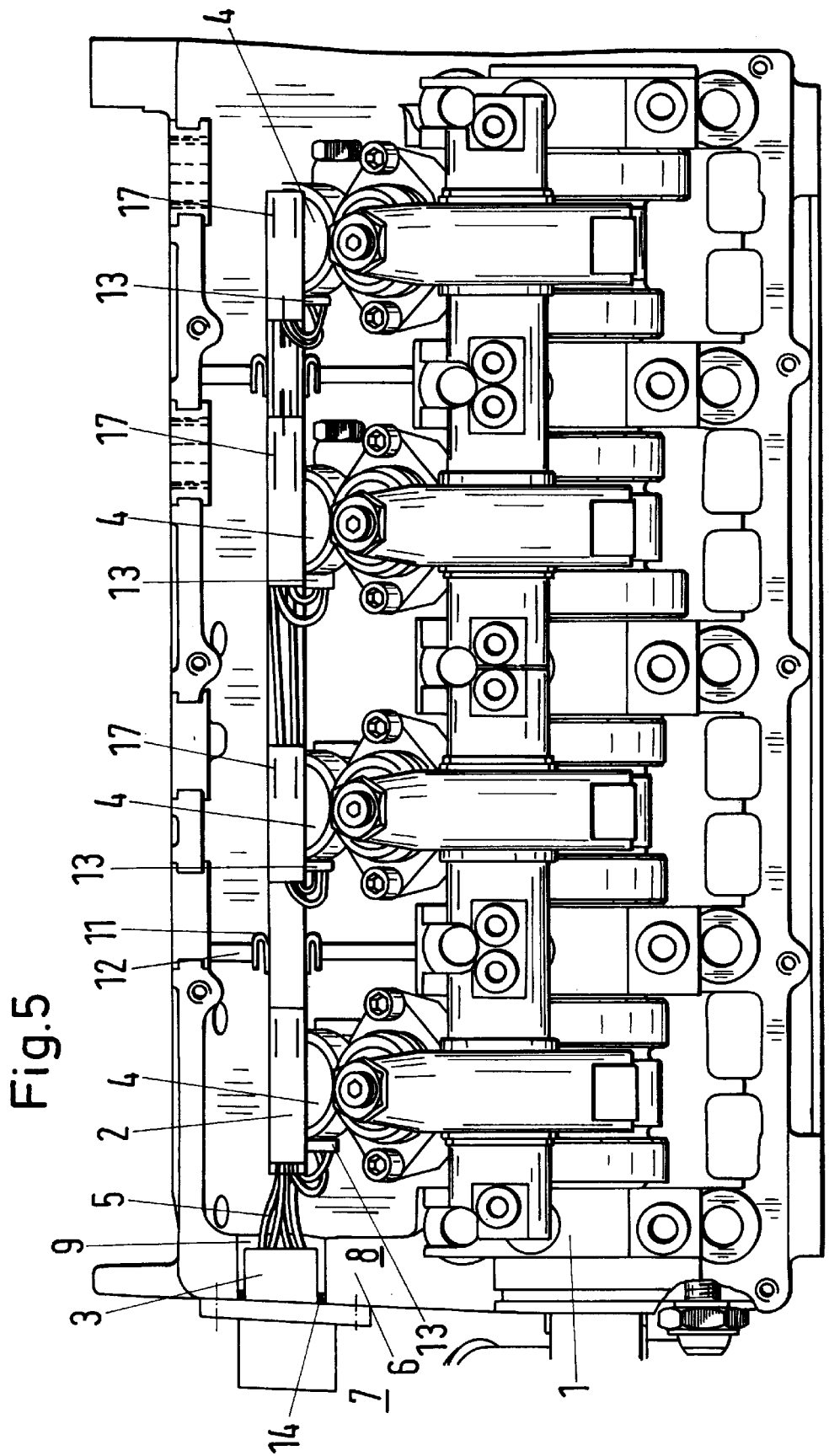

CABLING MODULE ARRANGEMENT

BACKGROUND OF THE INVENTION

This invention relates to cabling module arrangements which have a cabling strip and electrical wires on the cabling strip and a common plug with which at least some of the wires are electrically connectable.

U.S. Pat. No. 5,238,415 describes a multiway connector for common electric wiring of several electrically actuatable accessories in internal combustion engines, in particular fuel injection valves. In the multiway connector described therein, electrical conductors are inserted in a carrier part and in a cover part. Upon mounting of the cover part on the carrier part, electrical contact between the conductors is established.

This arrangement requires that the electrical conductors are integrated in the carrier part so that they can be contacted by simple mounting of the cover part. If, however, the electrically actuatable accessories are located in the middle of a component, then separate wires must be provided to connect them to a connector at the margin of the component.

A special disadvantage of using a contact arrangement of this kind is that relative motion between the carrier part and the cover part may impair engagement of the contacts.

Another disadvantage of such arrangements is that the contact engagement is blind, that is, engagement of the contacts cannot be inspected visually after assembly is completed. If contacting errors occur, it is difficult to locate them.

Further, the mounting of the conductors and contacts in the carrier and in the cover parts is relatively expensive.

SUMMARY OF THE INVENTION

Accordingly, it is an object of the present invention to provide a cabling module arrangement which overcomes disadvantages of the prior art.

Another object of the invention is to provide a cabling module arrangement which permits assembly-compatible electric connections of greatest simplicity, even for electrically actuatable accessories which are relatively inaccessible.

These and other objects of the invention are attained by providing a cabling module arrangement having a cabling strip arranged so that wires can be secured to the cabling strip with one or more wires branched away from the cabling strip, and including attachments by which the branching lines can be secured to the cabling strip.

With this arrangement, a compact cabling module arrangement is provided which can be inserted into an opening in a component in which the wiring is to be used. After the cabling module has been inserted, the individual electrically actuatable accessories are connected to the branching lines.

Preferably, the configuration of the cabling strip is geometrically stable, so that it is possible to mount the wires secured to the cabling strip, which are flexible, in predetermined installation positions. If the electrically actuatable accessories are, for example, magnetic valves, e.g. valves following pump nozzle elements in the cylinder head of an internal combustion engine, the cabling module can be inserted through an opening in the cylinder head wall.

The cabling strip desirably includes an arrangement for securing the cabling strip to the component. This arrangement may, for example, include spring clamps by which the cabling strip can be fixed in openings of housing partitions inside the component. After insertion of the cabling module, the electrically actuatable accessories are then connected to the branching lines. This is a simple matter, since the cylinder head is freely accessible from the top. When using a cabling module according to the invention, even electrically actuatable accessories located inside of a component can be electrically connected, since the connection is effected by the branching lines individually which are at the locations of the electrically actuatable accessories and which have appropriate length.

In accordance with the invention, the branching lines also have plugs which can be secured to the cabling module. The plugs are designed so that they can be connected to a matching contact or affixed to a matching part. This arrangement may, for example, result from a suitable configuration of the plug contact housing or of the plug contact itself. The cabling strip preferably includes a mounting arrangement for the plugs which may be, for example, latches in the form of a matching projections to receive the plugs and hold them, and indirectly, the electric vires to the cabling strip.

The branching lines include, for example, a current supply wire and a ground wire for the electrically actuatable accessary to which the branch line is to be attached. The current supply wires advantageously extend from a common plug at one end of the cabling strip to the corresponding accessory plug contact, from which a ground wire runs to the other end of the cabling strip. In this way, a constant number of electric wires are mounted along the length of the strip. As a result, the cabling strip may thus have a constant cross-section into which the electric wires are inserted, thereby optimally utilizing its volume.

One simple possibility for completing the circuit is to electrically connect the ground wires at the end of the cabling strip away from the common plug to a ground line which, in turn, is electrically connected to the common plug. In this way, a simple wire arrangement is provided having a constant number of electric wires along the entire cabling strip, as well as the ground wire and the current supply wires terminating at a common plug. Therefore, in order to cable the electrically actuatable accessories in the cylinder head, only a common plug and therefore a single opening in the cylinder head are required.

The cabling strip advantageously has a U-shaped or L-shaped, cross-section with a cover arrangement for closing the open side. The electrical cable is thus held in a fixed position and protected from damage. The cover arrangement may for example, be an extension from one side wall of the U-shaped cabling strip, with a flexible region provided in the material between the side wall and the extension. The extension is thus made movable relative to the side wall because of the flexible region and can be connected to the other side wall so that the open side of the U-shaped cabling strip can be closed. The cover can therefore be made in an especially simple manner during injection molding of the cabling strip, the mobility of the cover being provided in a controlled manner by the flexible region. The flexible region may for example be a line of reduced thickness between the wall and the attached cover.

Further, the accessory plug for each actuatable element includes a housing and a contact, and the cabling strip, the plug housing and the common plug are preferably made of a temperature-resistant material which is chemically resistant to the lubricant and possibly penetrating fuel, for example the polyamide plastic material known to those skilled in the automotive art as PA 46. This is especially advantageous if inorganic or organic oils are used as lubricants, or alcohol, Diesel or rapeseed oil as fuel, since such lubricants and fuels are highly aggressive chemically.

By the use of PA 46, the parts are rendered chemically, mechanically and thermally resistant throughout their lifetime to the environmental stresses to which they are exposed.

The electric wires and/or the accessory plug contact and/or the common plug contacts are preferably made of nickel silver, preferably CuNi 12 Zn 24 or CuNi 19 Zn 20, or gold, or are coated with these materials.

If, for example the cabling module is employed in a cylinder head, the cylinder head in assembled condition is difficult of access from the outside, so that reliable contacting is especially important. Reliable plug contacting is provided by the arrangement described above even in a lubricant-filled space which is at elevated temperatures and subjected to shock and vibrations.

BRIEF DESCRIPTION OF THE DRAWINGS

Further objects and advantages of the invention will be apparent from a reading of the following description in conjunction with the accompanying drawings, in which;

FIG. 1 is a side view showing a representative embodiment of a cabling module according to the invention having branching electrical lines;

FIG. 2 is a view similar to FIG. 1 showing the cabling module with electrical plug contacts secured to the cabling strip;

FIG. 5 is a bottom view of a cylinder had for an internal combustion engine with a cabling module installed.

DESCRIPTION OF PREFERRED EMBODIMENTS

Figure 3:
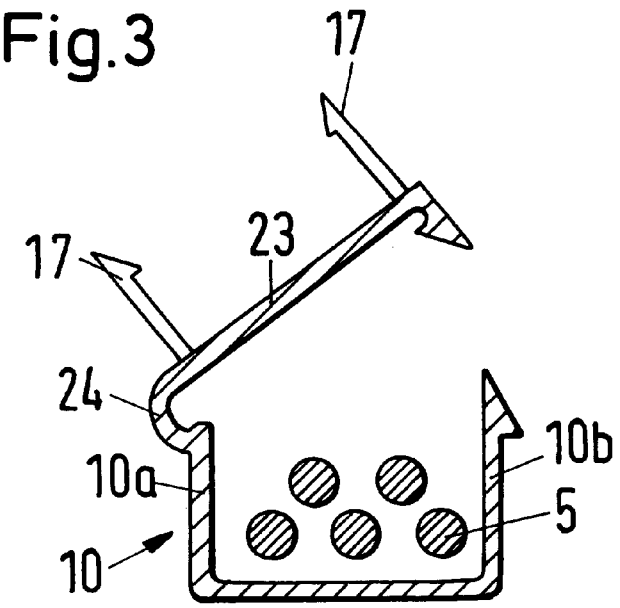
FIG. 3 is a cross-sectional view showing a representative embodiment of a U-shaped cabling strip with wires arranged therein.

In the typical arrangement shown in FIG. 1, a cabling module 2 has insulated electric wires 5, a cabling strip 10, and a common plug 3 to which electric signals or power are supplied from an external source. The wires 5 include a plurality of signal supply wires which pass from the common plug 3 to a plurality of accessory plugs 13 and a plurality of ground wires 16 which pass from the accessory plugs 13 to an end 10d of the cabling strip 10. From the end 10d a common ground wire 18 passes back to the opposite end 10c of the cabling strip 10 which is adjacent to the common plug 3. The ground wires 16 and 18 are insulated at the end towards the end 10d of the cabling strip 10 and are electrically connected to a parallel ground connector 19. At the end 10c of the cabling strip 10, the ground wire 18 and the signal supply wires 22 are electrically connected to corresponding electrical contacts 29 in the common plug 3. Four accessory plugs 13 are provided in the typical embodiment shown in FIG. 1. Along the entire length of the cabling module 2, only five wires 5 extend in parallel since only each signal supply wire 22 from the common plug branches off to an accessory and is replaced by a ground wire 16 entering the cabling strip 10 at the same location and extending in the opposite direction from the common plug. An accumulation of ground wires, such as would result for example if the ground wires 16 were all directed back to the common plug 13 at the end 10c, is thus avoided.

FIG. 2 shows a cabling module 2 with the accessory plugs 13 attached to the cabling strip 10. The plugs 13 are held to the cabling strip 10 by holders such as latches 17 which are best seen in FIG. 3. This produces a compact construction enabling the cabling strip 10 with the attached plugs 13 and the connecting wires 5 to be inserted together through an opening 9 of the component 1 shown in FIG. 5.

FIG. 3 shows a cross-section of the U-shaned cabling strip 10 with the wires 5 inserted therein. The U-shaped cabling strip 10 has opposed side walls 10a and 10b joined by a bottom wall. A cover 23, which is in this case is an extension of the side wall 10a, is provided. Between the extension 23 and the side wall 10a, the cabling strip has a flexible region 24. The flexible region 24 may, for example, consist of a thinner wall part or a gap in the wall material. The extension 23 is angularly movable relative to the side wall 10a along the flexible region 24. By bending the extension 23 down and connecting it to the other side wall 10b, the open side of the U-shaped cabling strip 10 can be closed. The connection of the extension 23 to the side wall 10b can be made in an especially simple manner by a latch. On the top of the extension 23, the latch 17 may, for example, constitute mating clip parts having a spring action, between which the accessory plugs 13 can be held in clamped fashion when the accessory plugs are thus attached to the cabling strip 10. The ground wires 16 and the signal supply wires 22 for the accessory plugs 13 extend through openings 25 between spaced parts of the extension 23 from the U-shaped cabling strip 10 and are held against the top of the extension 23 between the clips of the latch 17. This allows the shape of the accessory plugs 13 which is required for plugging them into the electrically actuatable accessories to be utilized also for securing the plugs 13 to the cabling strip 10.

Figure 4:
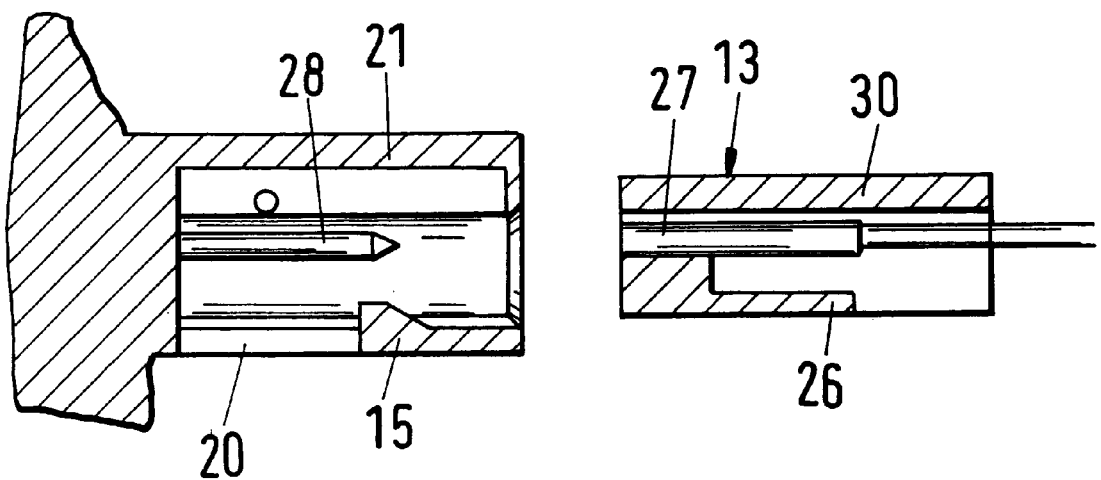
FIG. 4 is a longitudinal sectional view illustrating a plug with a plug housing and contacts.

The connection of the plug 13 to an accessory is shown in FIG. 4. The plug 13, which consists of a housing 30 and a contact 27, is insertable in a receptacle 21 on the accessory and is secured there by a fastening device such as a catch for example. The catch in the illustrated example includes an edge 26 of the housing 30 for the plug 13 which catches behind an edge 15 upon insertion of the plug into the receptacle 21. The engaging contacts 27 and 28 in these components are advantageously made of nickel silver, preferably CuNi 12 Zn 24 or CuNi 18 Zn 20, or gold, or are coated with one of these materials.

The common plug 3 and/or the housing 30 of the accessory plugs 13 and/or the cabling strip 10 are preferably made of PA 46 which is a material chemically resistant to conventional lubricants such as mineral oil, as well as to organic lubricants such as rapeseed oil for example, and sufficiently resistant also, over the entire life of the cabling module 2, to the mechanical and thermal stresses occurring in components such as the cylinder head 1. The insulation of the wires 5, 16, 18 and 22 is for example polytetrafluoroethylene, or includes constituents made of polytetrafluoroethylene, rendering it resistant to the lubricant, such as mineral oil or an organic oil, chemically, and resistant also to the thermal stresses that occur.

FIG. 5 shows the cabling module 2 assembled into the component 1, which is a cylinder head. The cylinder head 1 is at least partly filled with a lubricant which may contain small amounts of fuel and fuel additives. The cabling module 2, in the assembled condition shown in FIG. 2, is inserted through the opening 9 in the cylinder head housing wall 6 and is secured by retaining devices 11, such as, for example, spring clips in openings in housing partitions inside the cylinder head 1. After insertion of the cabling module 2, the common plug 3 is secured to the housing wall 6, for example by tongue and groove connections. A radial seal 14 having sealing lips is inserted between the common plug 3 and the housing wall 6 so that leakage of lubricant from the lubricant-filled space 8 into the lubricant-free space 7 is prevented and, conversely, leakage of liquids diluting or contaminating the lubricant, such as for example water, into the lubricant-filled space is prevented. After insertion of the cabling module 2, the electrical connections can be effected through the open part of the cylinder head 1. The accessory plugs 13 are plugged into the corresponding receptacles 21 associated with the electrically actuatable accessories 4, producing an electrical connection between the contacts 29 in the common plug 3 and the electrically actuatable accessories. The cabling module 2 provides a secure cabling arrangement for electric valves, associated for example with pump nozzle elements, which is capable of convenient assembly and disassembly.

If there is any defect in the wires 5, 16, 18 and 22 or the contacts 27, the wires 5, 16, 18 and 22 may, if desired, be replaced separately from the cable strip by removing the accessory plugs 13 from the associated accessories, and freeing the cable strip cover 23 from the side wall 10b and then pulling out the wires. Thus, the cabling strip 10 itself remains in the cylinder head 1. This is especially advantageous because the cabling strip is deliberately made geometrically stable, i.e. inflexible, and, with crowded space conditions in the engine compartment, it would be difficult to extract the cabling strip from the cylinder head 1. After pulling the wires 5, 16, 18 and 22, new wires 5, 16, 18 and 22 and related plugs 3 and 13 can be reinstalled in the reverse sequence of steps. Use is thus advantageously made of the fact that the wires 5, 16, 18 and 22 are in themselves flexible, and so can be inserted through the opening 9 even under crowded space conditions.

Although the invention has been described herein with reference to specific embodiments, many modifications and variations therein will readily occur to those skilled in the art. Accordingly, all such variations and modifications are included within the intended scope of the invention.

We claim:

1. A cabling module arrangement comprising a cabling strip containing electric wires and having a geometrically stable configuration and a common plug connectable to at least some of the wires, retaining means for retaining the wires to the cabling strip, a plurality of wires branched off from the cabling strip, attachment means for attaching the branched off wires to the cabling strip and a plurality of accessory plugs each connected to one branched off signal supply wire and one ground wire and wherein the signal supply wires extend from a first end of the cabling strip to the accessory plugs and the ground wires extend from the accessory plugs to a second end of the cabling strip.

2. A cabling module arrangement according to claim 1 including means for securing the cabling strip to a component in which it is mounted.

3. A cabling module arrangement according to claim 1 wherein the retaining means has openings spaced in the lengthwise direction of the strip through which wires branched off from the cabling strip can emerge, and connector plugs connected to the wires branched off from the cabling strip which can be affixed to the cabling strip.

4. A cabling module arrangement according to claim 1 wherein the wires branched off include a signal supply wire and a ground wire for an electrically actuatable accessory.

5. A cabling module arrangement according to claim 1 wherein the ground wires from the accessory plugs are electrically connected to a common ground wire at the second end of the cabling strip and the common ground wire is electrically connected to the common plug.

6. A cabling module arrangement according to claim 1 wherein the cabling strip has laterally spaced first and second side walls providing an open side in cross-sectional configuration and wherein the open side is at least partially enclosed by the retaining means.

7. A cabling module arrangement according to claim 6 wherein the retaining means comprises an extension of the first side wall of the cabling strip and including a flexible region between the extension and the first side wall to permit relative motion of the extension with respect to the first side wall, and connecting means for connecting the extension to the second side wall.

8. A cabling module arrangement according to claim 1 including an accessory plug comprising a housing and at least one contact and wherein at least one of the accessory plug, the cabling strip housing, and the common plug comprises PA 46 polyamide plastic material.

9. A cabling module arrangement according to claim 1 including an accessory plug having a contact and wherein the common plug includes at least one contact and wherein at least one of the signal and ground wires, the common plug contact and the accessory plug contact comprise a metal selected from gold and nickel silver.

10. A cabling module arrangement according to claim 9 wherein the nickel silver comprises CuNi 12 Zn 24.

11. A cabling module arrangement according to claim 9 wherein the nickel silver comprises CuNi 18 Zn 20.

* * * * *